United States Patent [19]
Morimoto

[11] Patent Number: 5,659,379
[45] Date of Patent: Aug. 19, 1997

[54] ACTIVE MATRIX DISPLAY DEVICE WITH A COUNTER ELECTRODE HAVING MULTIPLE POTENTIAL SUPPLY TERMINALS IN AN AXIALLY ASYMMETRIC LAYOUT AND THE MANUFACTURE THEREOF

[75] Inventor: Hirokazu Morimoto, Tokyo, Japan

[73] Assignee: Kabushiki Kaisha Toshiba, Kawasaki, Japan

[21] Appl. No.: 494,294

[22] Filed: Jun. 23, 1995

[30] Foreign Application Priority Data

Jun. 23, 1994 [JP] Japan .................................. 6-140615
May 22, 1995 [JP] Japan .................................. 7-122466

[51] Int. Cl.⁶ .................................................. G02F 1/1343
[52] U.S. Cl. .............................................................. 349/149
[58] Field of Search ............................... 359/88; 349/149

[56] References Cited

U.S. PATENT DOCUMENTS 5,311,342  5/1994  Watanabe .................................. 359/88
5,488,498  1/1996  Fujii et al. ............................... 359/88
5,510,918  4/1996  Matsunaga et al. ...................... 359/88

FOREIGN PATENT DOCUMENTS 5-265025  10/1993  Japan ..................................... 359/88
6301045  11/1994  Japan .

*Primary Examiner*—William L. Sikes
*Assistant Examiner*—James A. Dudek
*Attorney, Agent, or Firm*—Cushman Darby & Cushman IP Group of Pillsbury Madison & Sutro, LLP

[57] ABSTRACT

The active matrix display device of the invention comprises an array substrate and a counter substrate carrying a counter electrode, the counter electrode 301 having first counter potential supply terminals 353-1~353-7 projecting from one side of the counter electrode 351 and second counter potential supply terminals 355-1~355-9 projecting from the other side of the counter electrode which is opposite to the above-mentioned one side, the first and second counter potential supply terminals being disposed in axially asymmetric relation to each other. In this arrangement, a power supply to the counter electrode 351 is sufficient to provide a high-quality display image and a plurality of counter substrates can be obtained from a single insulating substrate with high efficiency.

13 Claims, 12 Drawing Sheets

SIGNAL LINE DRIVING CIRCUIT BOARD SIDE

ACTIVE MATRIX DISPLAY DEVICE WITH A COUNTER ELECTRODE HAVING MULTIPLE POTENTIAL SUPPLY TERMINALS IN AN AXIALLY ASYMMETRIC LAYOUT AND THE MANUFACTURE THEREOF

BACKGROUND OF THE INVENTION a. Technical Field

The present invention relates to an active matrix display device comprising switching elements electrically connected to respective picture element electrodes and to a method of manufacturing the same.

b. Prior Art

Flat panel display devices, typically liquid crystal display devices, having a low profile, are lightweight and consume little power when compared to more conventional display devices. For these reasons, flat panel display devices are being applied in various fields such as display units of personal computers and word processors, TV display devices, and projection display devices.

Particularly desirable are active matrix display devices which comprise switching elements that are electrically connected to respective picture element electrodes. Such active matrix display devices are under intensive research and development because they provide for high-quality display images which are free of cross-talk between adjacent picture elements.

The general architecture of an active matrix liquid crystal display device of, for example, the light transmitting type is now briefly described. Such active matrix liquid crystal display device comprises a liquid crystal composition held between an array substrate and a counter substrate through orientation films. The array substrate comprises a plurality of signal lines and a plurality of scanning lines disposed in a matrix fashion on a glass substrate, with picture element electrodes being arranged through tin film transistors (hereinafter referred to briefly as TFT) provided as switching elements in the vicinity of respective junctions. Additional capacitor lines are also disposed substantially in parallel with the scanning lines on the glass substrate and an insulating film is interposed between the additional capacitor line and the picture element electrode so as to provide an additional capacitor (Cs) between the additional capacitor line and picture element electrode.

The counter substrate comprises a glass substrate having a light attenuating film and a counter electrode disposed thereon, the light attenuating film being oriented in a matrix fashion covering the TFTs and surroundings of the picture element electrodes.

Further, the respective signal lines and scanning lines of the array substrate are electrically connected to a driving circuit board through an FPC (flexible printed circuit) comprising a polyimide or other flexible substrate and metal wirings formed thereon or a TAB (tape automated bonding) comprising a flexible printed circuit board carrying driving elements thereon.

Moreover, the counter electrode of the counter substrate is electrically connected to the array substrate through a transfer comprising a dispersion of electrically conductive particles such as particles of silver in a resin matrix. The counter electrode is further electrically connected to the driving circuit board through, for example, said FPC or TAB.

SUMMARY OF THE INVENTION

The counter electrode of the counter substrate mentioned above is constituted and patterned by vapor depositions, sputtering, CVD or other film-forming technique through a mask of stainless steel or other suitable material.

In recent years, for enhanced productivity of such an active matrix display device, a plurality of array substrates or counter substrates are obtained from a single insulating substrate such as a glass substrate. In order to obtain a plurality of counter substrates from a single insulating substrate, e.g., a glass substrate, it is necessary to use a mask having a plurality of apertures or openings corresponding to the desired number of openings corresponding to the desired number of electrodes. In order to increase the utilization rate of an insulating substrate, the mask providing for such openings must have fine borderline portions.

However, if the borderline portion of a metal mask are too fine, the strength of the mask will not be sufficiently high, and the electrical film formation will become quite uneven in the neighborhood of the borderline portions. Moreover, no accurate patterning can be achieved in correspondence with the mask configuration so that a short circuit between the counter electrodes is liable to take place.

The present invention has an object to overcome the above-mentioned technical problems. More specifically, the object of the present invention is to provide an active matrix display device and a method of manufacturing the same, wherein a plurality of counter substrates can be efficiently obtained from a single insulating substrate. Another object of this invention is to provide a counter electrode capable of receiving a sufficient electric potential and formed with improved dimensional accuracy so as to provide for a satisfactory display image.

The active matrix display device according to one embodiment of the present invention includes an array substrate having a plurality of picture element electrodes, a counter substrate having a counter electrode opposed to the array substrate, and a light modulating layer held between the array substrate and counter substrate, the counter substrate being provided with first counter potential supply terminals disposed on a first side of the counter electrode and second counter potential supply terminals disposed on a second side of the counter electrode which opposes the first side in axially asymmetric relation to the first terminals.

Since the counter substrate of this active matrix display device has a common counter electrode equipped with first counter potential supply terminals on a first side thereof and second counter potential supply terminals on a second side thereof opposing the first side, the counter electrode is supplied with an adequate electric potential even if its size is large.

As a consequence, the displayed images experience no degradation on the so-called common inversion driving mode (e.g., the driving mode for reducing the signal amplitude by inverting the polarity every horizontal scanning period or every several horizontal scanning periods).

Furthermore, since the first and second counter potential supply terminals of the counter electrode are offset from the axis of symmetry, the intra-plane unevenness of the counter electrode potential is further decreased to provide for a satisfactory display image.

Another aspect of the active matrix display device having the construction of the first embodiment described above, is that the first counter potential supply terminals of the first electrode project from the first side and the second counter potential supply terminals project from the second side of the counter electrode.

In this arrangement, wiring from the driving circuit side to the first and second counter potential supply terminals is facilitated.

An additional aspect of the active matrix display device having the construction described above is that the first and second counter potential supply terminals are formed to project from a sealant region accommodating the light modulating layer.

In this construction, the transfer can be easily positioned with respect to the first and second counter potential supply terminals, and the light modulating layer can be rendered less susceptible to the influence of impurities from the transfer.

Another aspect of the active matrix display device having the construction first described is that the first and second counter potential supply terminals are formed within the sealant region accommodating the light modulating layer.

In this construction, the marginal region of the display device can be reduced in size.

Yet another aspect of the active matrix display device having the construction first described is that the first and second counter potential supply terminals are formed on the longitudinal sides of the picture area of the display device.

In this arrangement, the driving circuit can be formed along a longitudinal side of the picture area to provide an electric potential to the counter electrode.

Another aspect of the active matrix display device having the construction first described is that the first and second counter potential supply terminals are formed at transverse or short dies of the picture area of the display device.

In this construction, the driving circuit can be made in the shorter or transverse direction on the array substrate so as to reduce the frame size in the transverse direction of the screen.

Still another aspect of the active matrix display device having the construction first described is that the first and second counter potential supply terminals are formed on the four sides of the picture area of the display device.

In this arrangement, the intra-plane variation in the counter electrode potential can be diminished.

Another aspect of the active matrix display device having the construction first described is that a light attenuating film in a matrix fashion is formed on the array substrate.

In this construction, it is unnecessary to provide a light attenuating film on the counter substrate, and the margin of positioning the array and counter substrates can be increased without affecting the aperture ratio. Therefore the aperture ratio is determined within the array substrate, and not affected by alignment of the counter substrate to the array substrate.

An additional aspect of the active matrix display device having the construction first described is that color filters are formed on the array substrate.

In this arrangement, it is unnecessary to provide color filters on the counter substrate so that the margin of positioning the array and counter substrates can be increased without affecting the aperture ratio.

The method of manufacturing an active matrix display device includes the steps of forming first and second counter electrodes corresponding to first and second openings using a mask, the mask comprising the first and second openings separated by a borderline portion to provide a counter substrate assemblage, and taking out the first and second counter substrates from the counter substrate assemblage, one side of said borderline portion of the mask having first cuts extending from the first opening for providing the first counter electrode with first counter potential supply terminals and second cuts extending from the second opening for providing the second counter electrode with second counter potential supply terminals being formed in an alternating fashion.

Since this method uses the borderline portion of the mask for dividing the substrate into a plurality of counter substrates and that borderline portion has cuts for providing counter potential supply terminals as extending from both sides in an alternating fashion, the borderline portion may have a broad width so that the utilization efficiency of the substrate can be increased and the incidence of poor patterning be prevented. Thus, a plurality of counter electrodes can be obtained from a single insulating substrate with high efficiency.

This method of manufacturing an active matrix display device is such that first and second cuts extending from the first opening are formed on longitudinal sides of the first opening, and first and second cuts extending from the second opening are formed on longitudinal sides of the second opening.

Additionally, this method of manufacturing an active matrix display device is such that first and second cuts extending from the first opening are formed on transverse or short sides of the first opening, and first and second cuts extending from the second opening are formed on transverse or short sides of the second opening.

This method of manufacturing an active matrix display device is also such that the first and second cuts are extended from four sides of the first opening and another of the first and second cuts are extended from four sides of the second opening.

DETAILED DESCRIPTION OF THE PREFERRED EMBODIMENTS

First Embodiment

The active matrix liquid crystal display device (hereinafter referred to briefly as "liquid crystal display device") 1 according to the first embodiment of the present invention is now described in detail.

Figure 1:
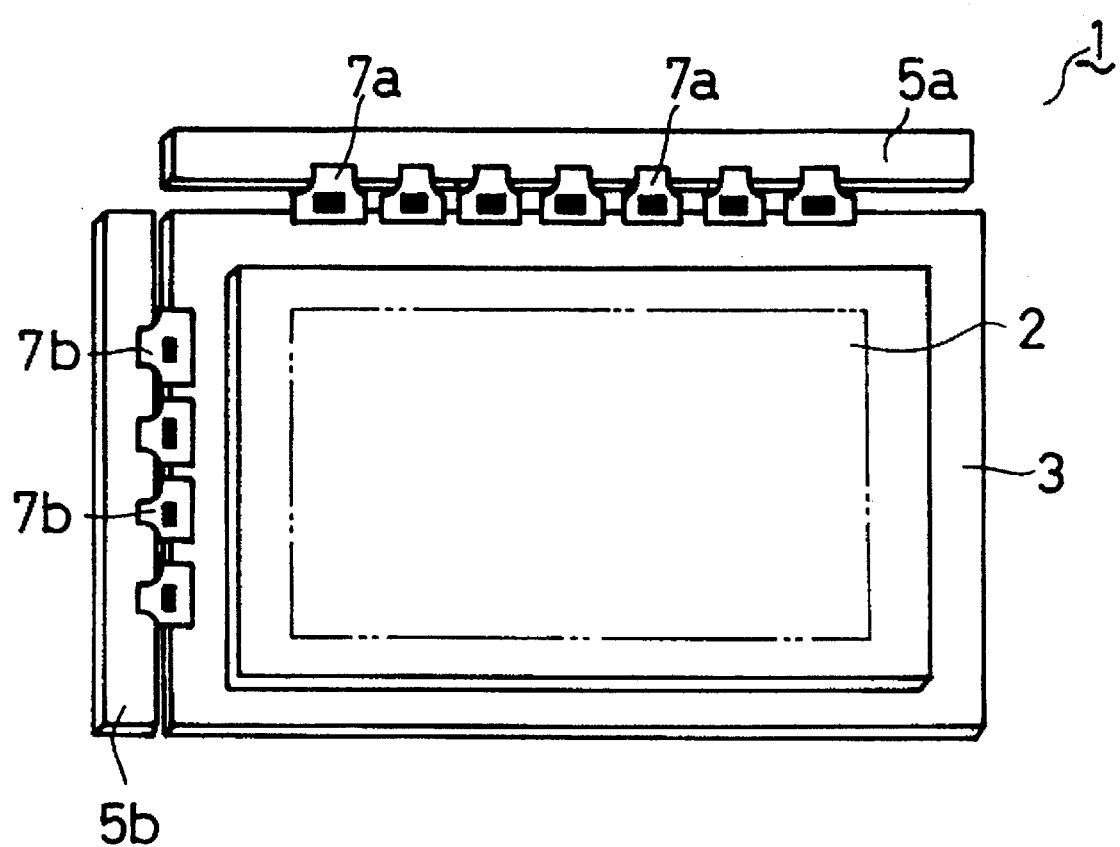
FIG. 1 is a perspective sketch showing a liquid crystal display device according to one embodiment of the present invention.

This liquid crystal display device 1 is normally white mode light-transmitting liquid crystal display device 1 as illustrated in perspective view in FIG. 1. The display device includes a display are 2 which enables a display in color and which has a diagonal size of 10.4 inches.

This liquid crystal display device 1 comprises liquid crystal display panel 3, a signal line driving circuit board 5a and a scanning line driving circuit 5b for driving said liquid crystal display panel 3, and TABs 7a, 7b for electrically connecting the driving circuit boards 5a, 5b respectively to the liquid crystal panel 3.

Figure 2:
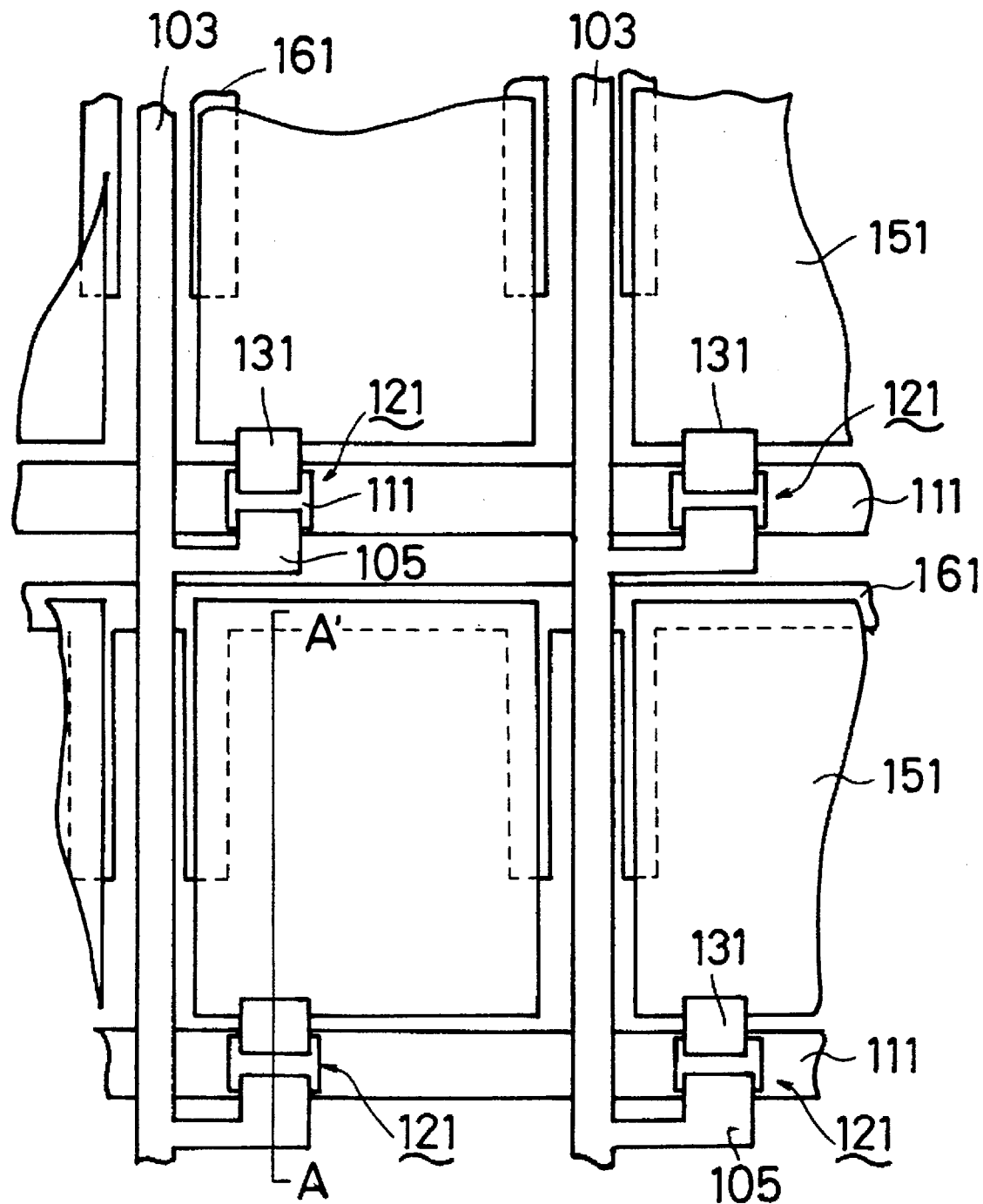
FIG. 2 is a sketch showing a part of the front view of the array substrate shown in FIG. 1.
Figure 3:
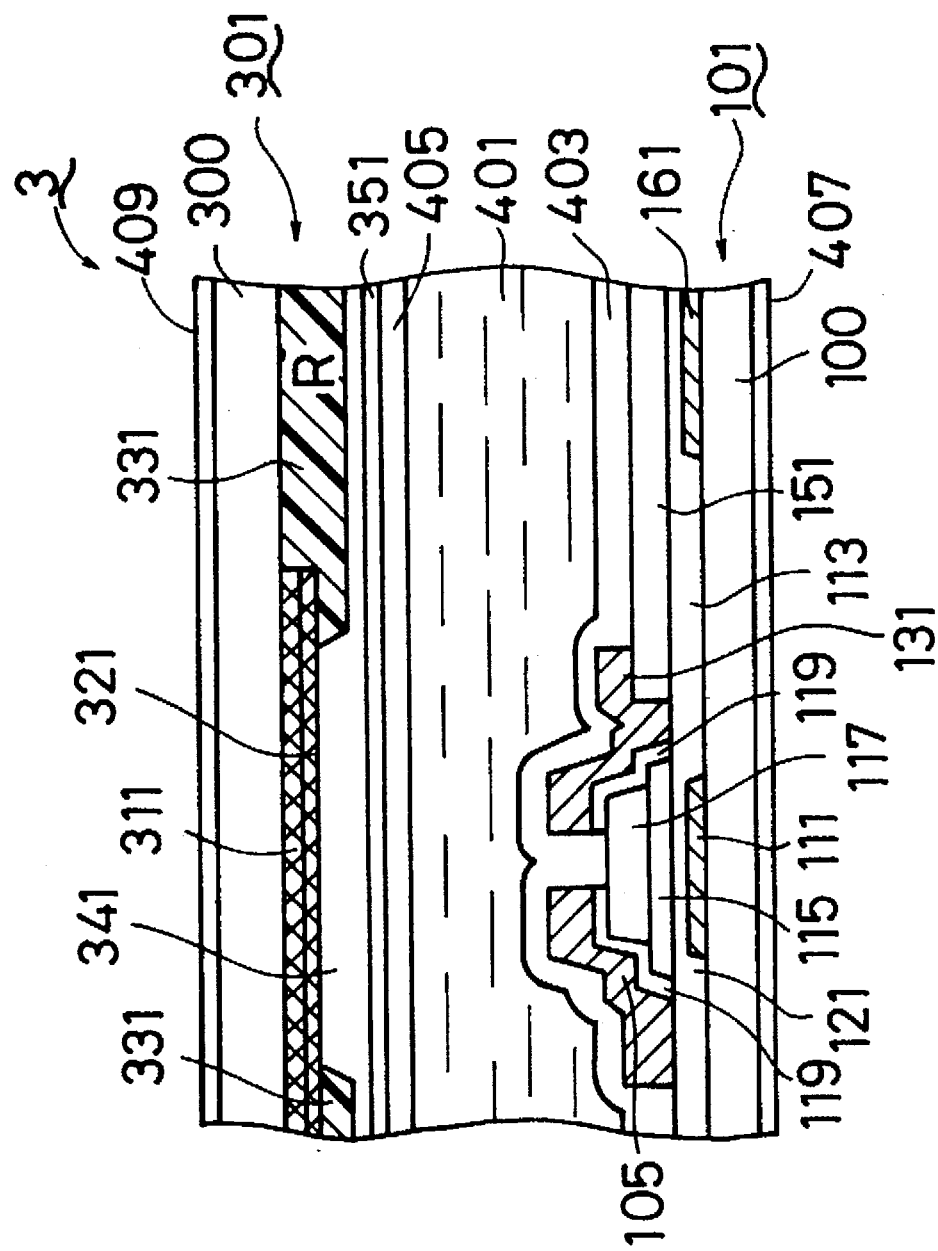
FIG. 3 is a sketch showing a cross-sectional view of the liquid crystal display device along the line A–A' of FIG. 2.

The liquid crystal panel 3, as shown in FIGS. 2 and 3, comprises an array substrate 101, a counter substrate 301, a liquid crystal composition 401 retained therebetween as a light modulating layer through orientation films 403, 405, the substrates being held together by a sealant (not shown). Disposed on the exterior surface of the respective substrates 101, 301 are polarizing sheets 407, 409 with their polarizing axes at right angles with each other.

The liquid crystal composition 401 is a twisted-nematic type composition. When a polymer dispersion type liquid crystal comprising a mixture of a transparent resin and a liquid crystal material is employed in lieu of said twisted-nematic liquid crystal, the orientation films 403, 405 and polarizing sheets 407, 409 need not be provided.

The array substrate 101 comprises a glass substrate 100 and, as disposed thereon, 640×3 signal lines 103 which are intersected by 480 scanning lines 111.

In this embodiment, the signal lines 103 and scanning lines 111 respectively extend out to one side of the wiring and, as shown in FIG. 1, supplied with driving voltages from the respective driving circuit boards 5a, 5b through TABs 7a, 7b.

As illustrated in FIGS. 2 and 3, this TFT 121 is formed such that the scanning line 111 serves as a gate electrode and a laminate insulating film 113 of silicon oxide and silicon nitride is superimposed thereon, with an a—Si:H film for a semiconductor film 115 being disposed on said insulating film 113. Furthermore, disposed on this semiconductor film 115 is a silicon nitride channel protecting film 117 formed in self-alignment with the scanning line 11. The semiconductor film 115 is electrically connected to the corresponding picture element electrode 151 through an n+ a—Si:H film disposed as a low resistance semiconductor film 119 and a source electrode 131. The semiconductor film 115 is electrically connected to the signal line 103 through an n+ a—Si:H film disposed as a low resistance semiconductor film 119 and a drain electrode 105 extending from the signal line 103.

There also is provided an additional capacitor line 161 disposed approximately in parallel with the scanning line 111 and having a region overlapping the picture element electrode 151, with the picture element electrode 151 and additional capacitor line 161 providing for additional capacitor (Cs).

The counter substrate 301 comprises a transparent glass substrate 300 and, as disposed thereon, a first light intercepting layer 311 comprising a matrix-fashion chromium oxide film and a second light intercepting layer 321 comprising chromium (Cr) as superimposed on said first light-intercepting layer 311. The light intercepting layers cover the TFT 121, the gap between signal line 103 and the picture element electrode 151, and the gap between the scanning line 111 and the picture element electrode 151, which are formed on the array substrate 101. Disposed between units each consisting of said first and second light intercepting layers 311, 321 are color filters of three primary colors, viz. red (R), green (G) and blue (B), for implementing a color display, namely color segments 331, with a counter electrode 351 constituted by an ITO being disposed through an organic protective film 341.

This counter electrode 351 is now described with reference to FIG. 4.

Figure 4A:
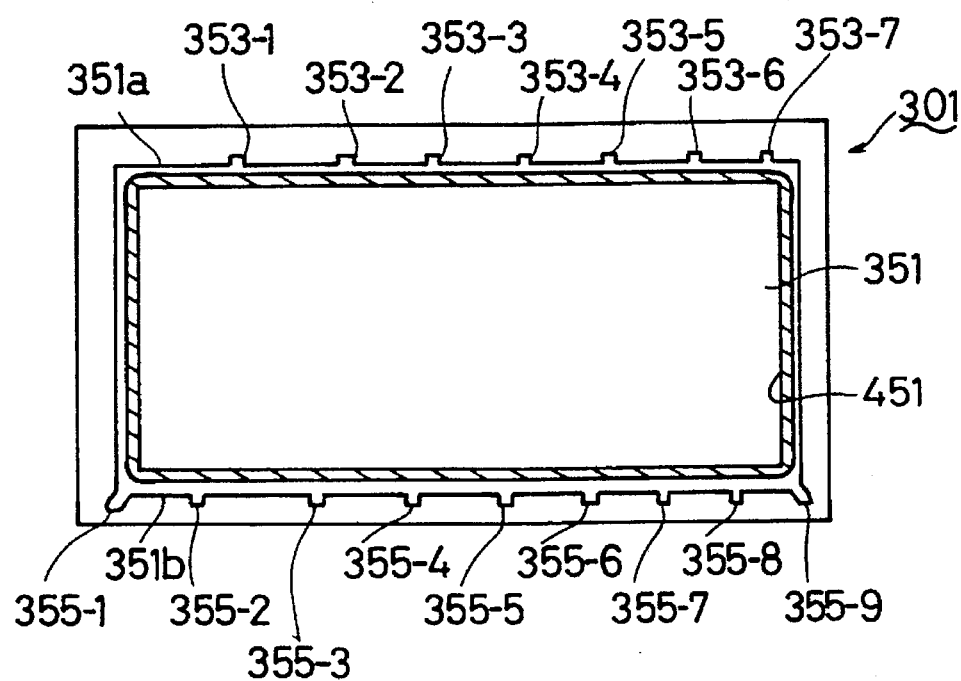
FIG. 4A is a sketch of the front view of the counter substrate and FIG. 4B is a sketch showing the front view, in part, of the array substrate, both relevant to the liquid crystal display device shown in FIG. 1.

FIG. 4A shows the counter substrate 301 as viewed from the polarizing sheet 409 side (see FIG. 3). AT the top of the view, the signal line driving circuit board 5a is electrically connected to the array substrate 101 through TAB 7a as shown in FIG. 1, while the scanning line driving circuit board 5b is electrically connected to the array substrate 101 through TAB 7b at left of the view.

The counter electrode 351 is formed in such a manner that first counter potential supply terminals 353-1, . . . 353-7 are projecting from one side 351a thereof in 7 positions in the longitudinal direction of the view, i.e., in the direction of the signal line driving circuit board 5a, and second counter potential supply terminals 355-1, . . . 355-9 are projecting from the other side 351b in 9 positions.

These first counter potential supply terminals 353-1, . . . 353-7 and second counter potential terminals 355-1, . . . 355-9 are extending outwardly of the sealant region 451. Moreover, said first counter potential supply terminals 353-1, . . . 353-7 and said second counter potential supply terminals 355-1, . . . 355-9 are disposed in axially asymmetric relation. In this embodiment, the first counter potential supply terminals 353-1, . . . 353-7 and second counter potential supply terminals 355-1, . . . 355-9 are respectively formed outwardly of said sealant region 451 because the positioning of the transfer is easier and the risk of degradation of the liquid crystal composition 401 due to the transfer is reduced as compared with the disposition inwardly of or within the sealant region 451.

Figure 4B:
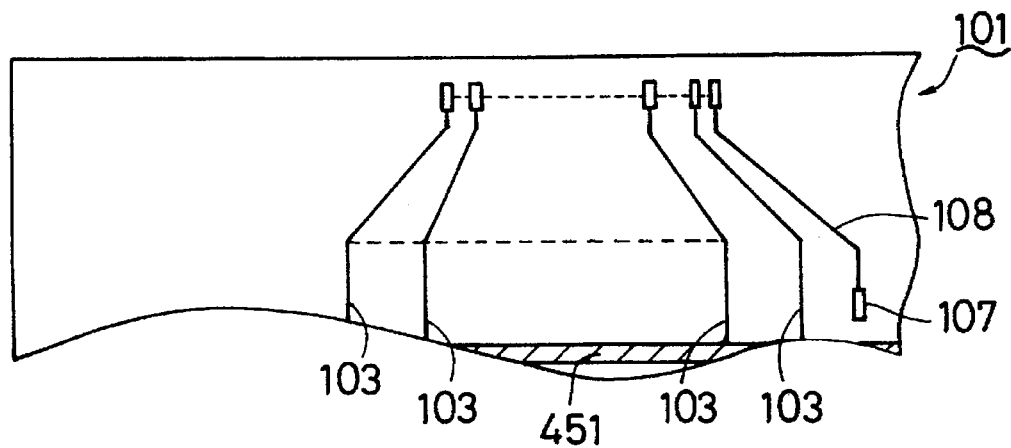

The first counter potential supply terminals 353-1, . . . 353-7 are each electrically connected to a first counter electrode connecting pad 107 formed on the array substrate 101 illustrated in FIG. 4B through a silver paste as a transfer, and extend to the edge of the array substrate 101 through a first counter electrode connecting wiring 108 which is formed concurrently with the signal line 103. The first counter electrode connecting wiring 108 is electrically connected to the signal line driving circuit board 5a shown in FIG. 1 through a portion of TAB 7a by which the signal lines 103 are electrically connected to the signal line driving circuit board 5a.

Thus, according to this liquid crystal display device 1, where a plurality of first counter potential supply terminals 353-1, . . . 353-7 and a plurality of second counter potential supply terminals 355-1, . . . 355-9 are formed on opposite sides 351a, 351b of the counter electrode 351, an adequate supply of power to the counter electrode is insured. Furthermore, since the first counter potential supply terminals 353-1, . . . 353-7 and second counter potential supply terminals 355-1, . . . 355-9 are disposed offset from the axis of symmetry, the variation of electric potential within the plane of the counter electrode 351 is further reduced so that a display image of improved quality can be provided.

Furthermore, this liquid crystal display device is advantageous in that there occurs no degradation of the display image even when the polarity of potential of the counter electrode 351 is inverted every horizontal scanning period of every few horizontal scanning periods for reducing the signal amplitude and preventing the flicker of the display image, that is to say on the so-called common inversion drive mode.

The method of preparing the counter substrate 301 of the liquid crystal display device of the above construction is now described with reference to FIGS. 5A–5D.

For explanation's sake, it is assumed that a glass substrate measuring 360 mm×465 mm is provided and that 4 counter substrates 301 are fabricated from this glass substrate.

Figure 5A:
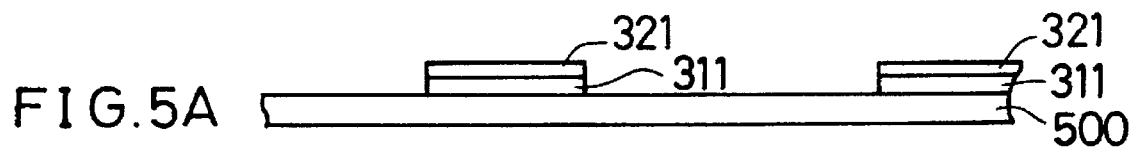
FIGS. 5A–5D are diagrams showing the production process for the counter substrate of the liquid crystal display device of FIG. 1.
Figure 5B:
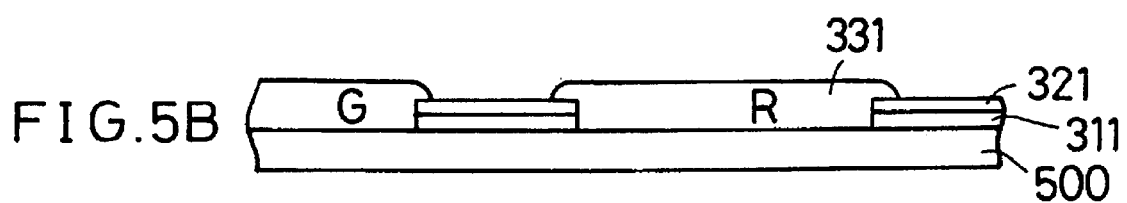

First, as shown in FIG. 5A, a first light intercepting layer 311 of chromium oxide in a matrix form and a second light intercepting layer 321 composed of chromium (Cr) overlying said first light intercepting layer 311 are formed on the above glass substrate 500. The light intercepting layers 321 cover the TFT 121, the gap between the signal line 103 and the picture element electrode 151, and the gap between the scanning line 111 and the picture element electrode 151, which are formed on the array substrate 101 as shown in FIGS. 2 and 3. The first light intercepting layer 311 is constituted with a chromium oxide film to prevent the decrease of contrast due to reflection of external light on the visual plane. It should be understood that the light intercepting layers need not be made of metallic materials as in this embodiment but can be made of, for example, black resin. It is also preferable that the first and second light intercepting layers 311, 321 be provided with aligning marks at their formation.

Then, on the glass substrate 500 between the adjacent sets of first and second light intercepting layers 311, 321 shown in FIG. 5S, color regions 331 comprising the three primary colors of red (R), green (G) and blue (B) are formed. The color region 331 can be formed by a printing process using an ink comprising a dispersion of the corresponding color material, by a photolithography process, or by a dyeing process. Moreover, when an electrode corresponding to each color region 331 is formed beforehand, the color region 331 can be provided by the electrodeposition technique. As an alternative, the color region 331 may be formed by ejection of an ink.

Figure 5C:
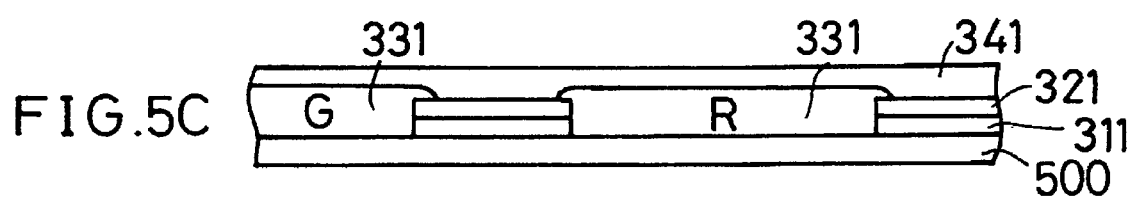

Then, as shown in FIG. 5C, an organic protective film 341 of acrylic resin is formed on the first and second light intercepting layers 311, 321 and color regions 331. This organic protective layer 341 serves as a smoothing layer in the formation of the counter electrode. It also prevents ingress of contaminants from the color regions 331 into the liquid crystal composition 401. If the respective color regions 331 are smooth enough, the organic protective film 341 need not be provided.

Figure 5D:
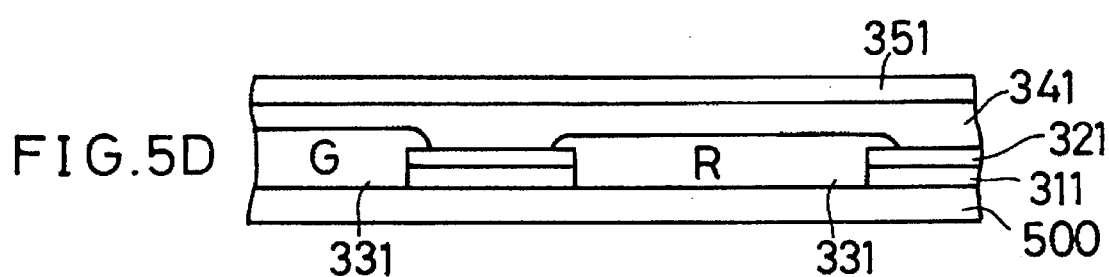
Figure 6A:
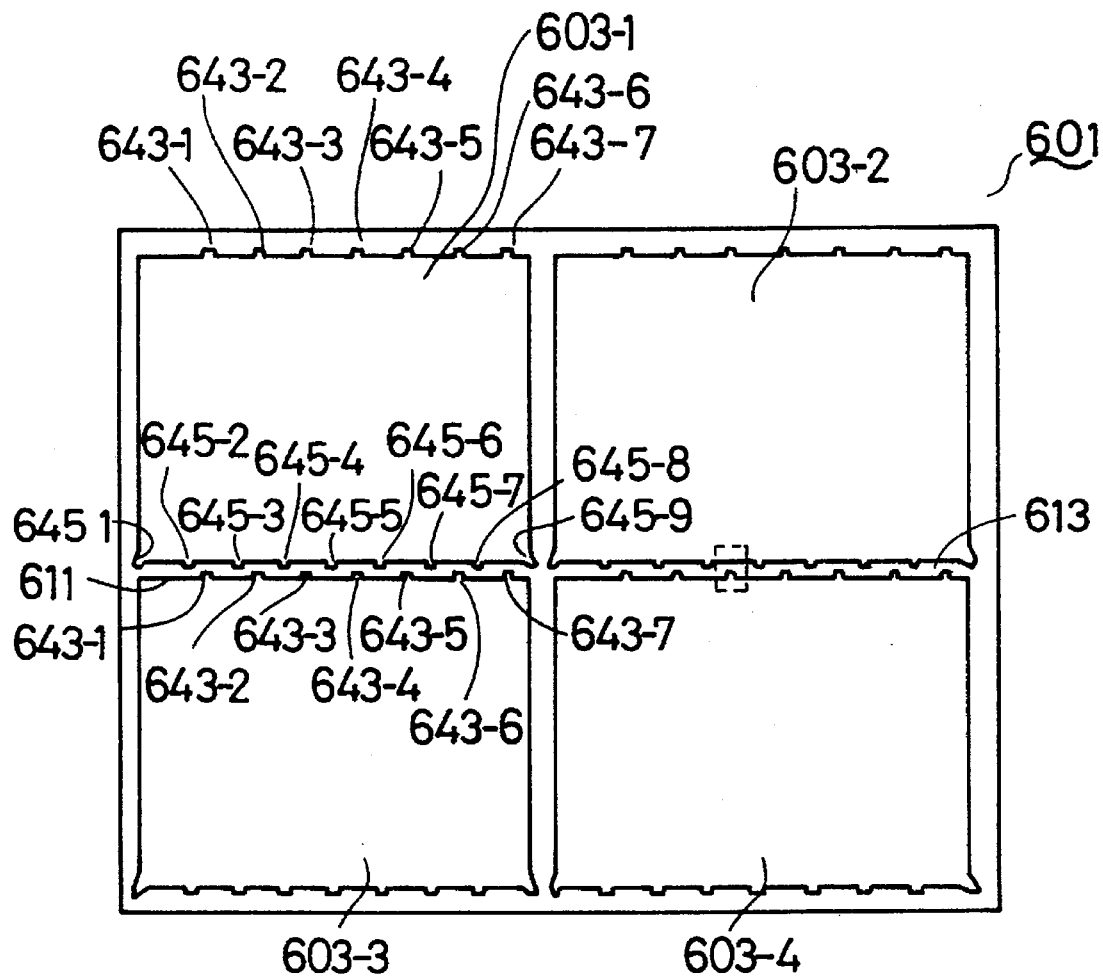
FIGS. 6A and 6B are sketches of the front view of the mask pattern for use in the formation of the counter electrode of the liquid crystal display device shown in FIG. 1.
Figure 6B:
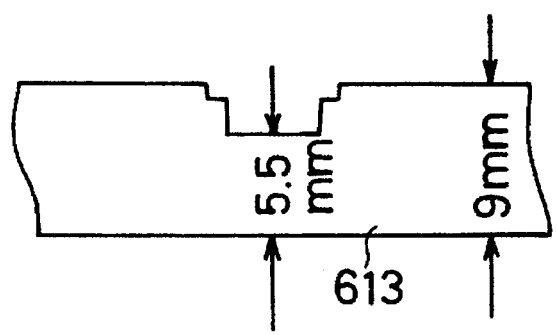

Then, a stainless steel sputter mask 601 shown in FIGS. 6A, 6B is disposed in registry and an ITO film is formed in a deposit thickness of, for example, 1500 Å units in a sputtering apparatus not shown to provide a counter electrode 351 as shown in FIG. 5D. The thickness of this counter electrode 351 is preferably controlled within the range of 1300–1700 Å units in consideration of the resistance of the counter electrode 351 itself and for prevention of moire.

As illustrated in FIG. 6A, this sputter mask 601 has an exterior size substantially equal to that of said glass substrate 500, namely 360 mm×465 mm. It is provided with four openings 603-1, 603-2, 603-3, and 603-4 of the same configuration as the counter electrode 351 so that four counter substrates 301 may be obtained from this glass substrate 500. The first opening 603-1 and the third opening 603-3 are divided by a fine borderline portion 611 of the sputter mask 601, and the second opening and the fourth opening 603-4 are divided by a fine borderline portion 613.

This sputter mask 601 is formed with outwardly extending first cuts 643-1, . . . 643-7 corresponding to the first counter potential supply terminals 353-1, . . . 353-7 of the counter substrate 351 from one side defining the first opening 603-1 of the sputter mask 601. Moreover, the sputter mask 601 is provided with second cuts 645-1, . . . 645-9 corresponding to second counter potential supply terminals 355-1, . . . 355-9 as extending from the other side opposing said one side defining the first opening 603-1. The other openings 603-2, 603-3, and 603-4 are also provided with first cuts 643-1, 643-7 and second cuts 645-1, . . . 645-9.

The first cuts 643-1, . . . 643-7 and second cuts 645-1, . . . 645-9 of the sputter mask 601 corresponding to the first counter potential supply terminals 353-1, . . . 353-7 and second counter potential supply terminals 355-1, . . . 355-9 of the counter electrode 351, and are disposed in axially asymmetric relation. Thus, the fine borderline portion 611 isolating the first opening 603-1 and third opening 603-3 from each other, and the fine borderline portion 613 isolating the second opening 603-2 and fourth opening 603-4 from each other, are formed with first cuts 643-1, 643-7 and second cuts 645-1, . . . 645-9 in an alternating fashion.

Since the fine borderline portion 611 between the first opening 603-1 and third opening 603-3 and the fine borderline portion 613 between the second opening 603-2 and fourth opening 603-4 have first cuts 643-1, . . . 643-7 and second cuts 645-1, . . . 645-9 in an alternating fashion rather than a corresponding fashion, even the narrowest parts of the fine borderline portions have masking width of not less than 5.5 mm.

Therefore, there is not defect of ITO film formation and the sputter mask 601 has a sufficient rigidity to withstand deflection so that the counter electrode 351 can be formed with good accuracy.

While, in this embodiment, the narrowest parts of the fine borderline portions 611, 613 of the sputter mask 601 have a masking width of about 5.5 mm, satisfactory film formation can be implemented only if the masking width of the narrowest part of the sputter mask 601 is at least 1.8 mm.

After formation of a counter substrate assemblage 501 in the above manner, this assemblage is divided by scribing into 4 counter substrates 301 (not shown). Then, in accordance with the conventional procedure, an orientation film 405 is formed and the array substrate 101 and the counter substrate 301 are laminated with a sealant applied to the sealant region 451 shown in FIG. 4A, and the liquid crystal material 401 is injected and sealed. Then, the TABs 7a, 7b shown in FIG. 1 are connected by thermal pressure bonding through an isotropic conductive film (not shown) and the input wirings (not shown), of the TAB 7a, 7b are connected to the driving circuit boards 5a, 5b by soldering.

The liquid crystal display device 1 according to this embodiment is thus provided.

Thus, in the liquid crystal display device 1 of this embodiment, the first counter potential supply terminals 353-1, . . . 353-7 and second counter potential supply terminals 355-1, . . . 355-9 of the counter electrode 351 are not disposed in axially symmetrical relation. Therefore, the fine borderline portions 611, 613 of the sputter mask 601 are located in such a manner that the first cuts 643-1 . . . 643-7 and second cuts 645-1, . . . 645-9 are alternatively extending from the two sides. For this reason, the fine borderline portions 611, 613 have a masking width of not less than 5.5 mm at the minimum so that the counter electrode 351 can be provided without the risk of defective formation of the ITO film and with good accuracy.

In the above description of the embodiment, the counter electrode 351 is constituted with an ITO film. However, only if a transparent electrically conductive material is used, the counter electrode 351 can be provided not only in the form of an ITO film but also by vapor deposition or CVD.

The sputter mask 601 is made of stainless steel in the above description but if due attention is paid to rigidity and thermal expansion coefficient, various copper-based alloys can likewise be employed.

Second Embodiment

Figure 7:
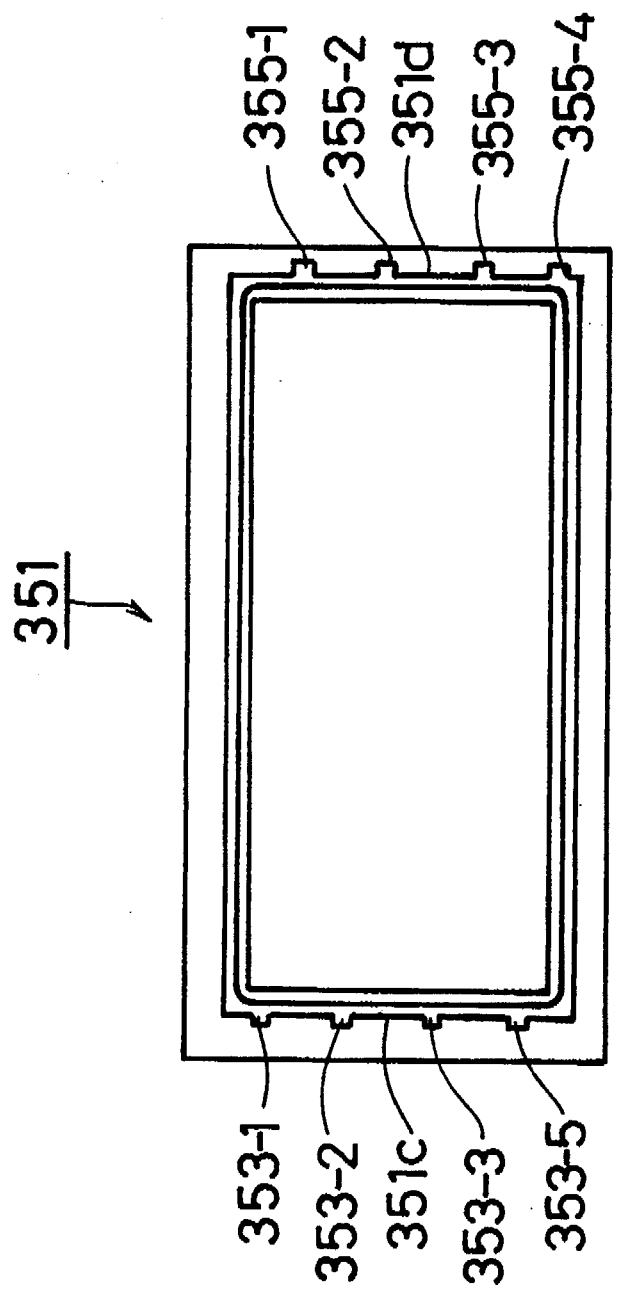
FIG. 7 is a diagram showing the production process for the counter electrode according to a second embodiment.

Shown in FIG. 7 is a counter electrode 351 according to a second embodiment of the present invention. It is different from the counter electrode 351 of the first embodiment in that the first counter potential supply terminals and second potential supply terminals are located in different positions.

Thus, one short side 351c of the signal line driving circuit board 5a and the other short side 351d thereof are formed with outwardly extending first counter potential supply terminals 353-1, . . . 353-4 and second counter potential supply terminals 355-1, . . . 355-4, respectively. Moreover, said first counter potential supply terminals 353-1, . . . 353-4 and said second counter potential supply terminals 355-1, . . . 355-4 are disposed in axially asymmetric relation.

Figure 8:
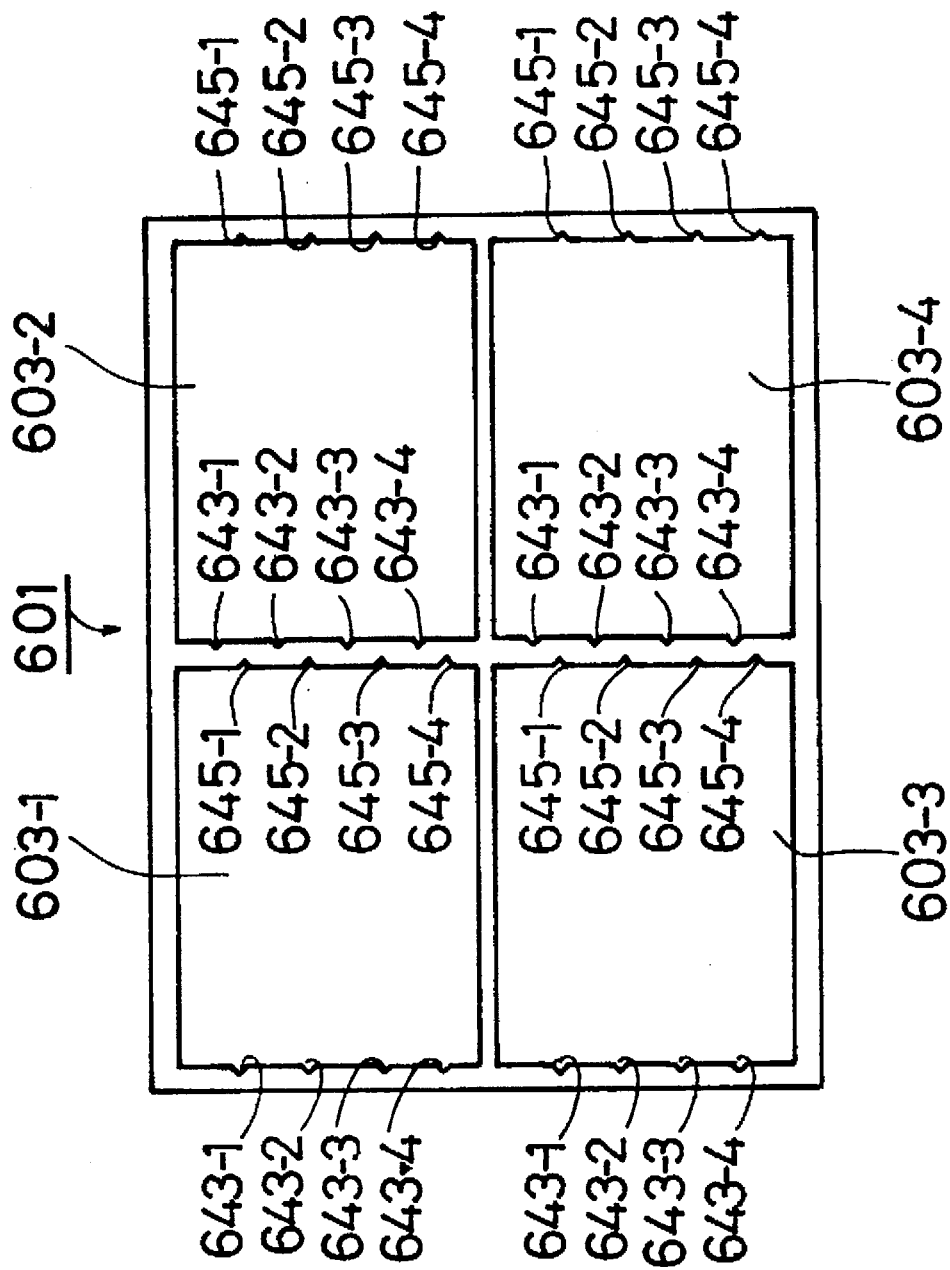
FIG. 8 is a sketch of the front view of the mask pattern for the formation of the counter electrode shown in FIG. 7.

FIG. 8 shows a sputter mask 601 for use in the fabrication of the counter electrode 301 according to this second embodiment.

Just as in the first embodiment, the first opening 603-1 through the fourth opening 603-4 of the sputter mask 601 are formed with outwardly extending first cuts 643-1, . . . 643-4 in correspondence with the first counter potential supply terminals 353-1, . . . 355-4 of the counter electrode 351 and outwardly extending second cuts 645-1, . . . 645-5 in correspondence with the second counter potential supply terminals 355-1, . . . 355-4.

Third Embodiment

Figure 9:
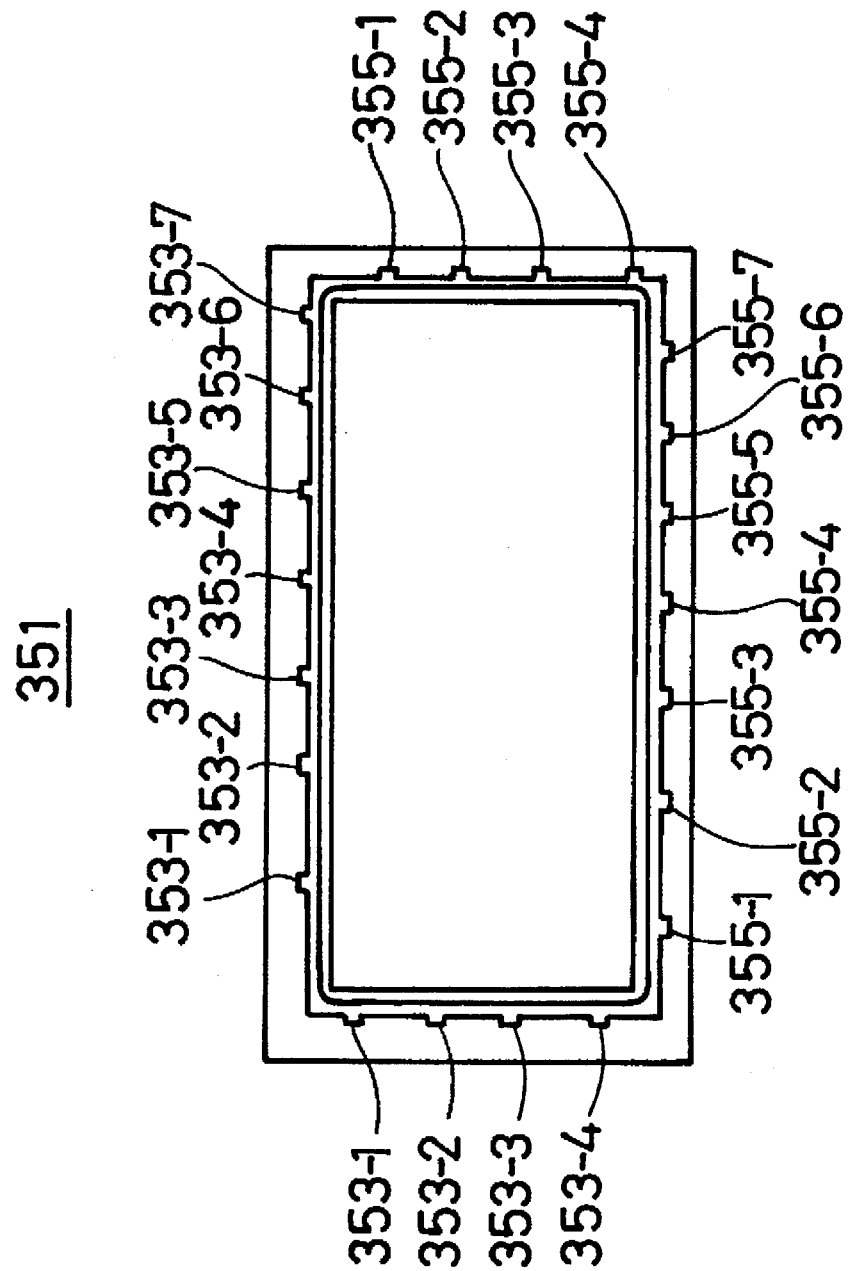
FIG. 9 is a diagram showing the production process for the counter electrode according to a third embodiment.

FIG. 9 shows a counter substrate 301 according to a third embodiment of the present invention. This embodiment is different from the first embodiment in that the first counter potential supply terminals 353 and second counter potential supply terminals 355 are disposed at the four sides of the counter electrode 351. And the first counter potential supply terminals 353 and the second counter potential supply terminals 355 are disposed in axially asymmetric relation.

Figure 10:
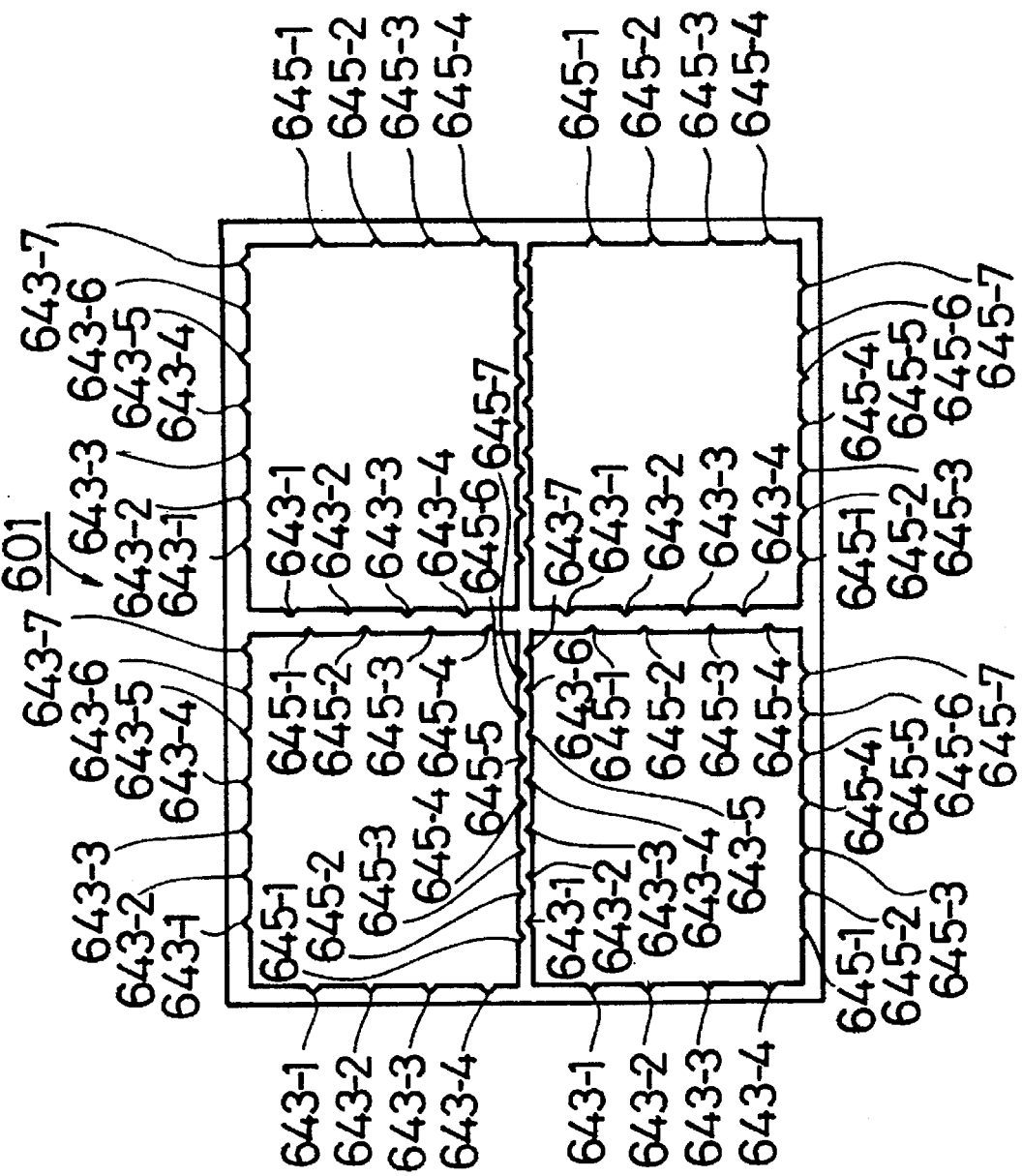
FIG. 10 is a sketch of the front view of the mask pattern for the formation of the counter electrode according to the third embodiment.

FIG. 10 is a plan view of the sputter mask 601 for use in the fabrication of the counter substrate according to this embodiment. As shown, for each of the first opening 603-1 through the fourth opening 603-4, the first cuts 643 and the second cuts 645 are positioned in correspondence with the first counter potential supply terminals 353 and the second counter potential supply terminals 355, respectively.

Fourth Embodiment

Figure 11:
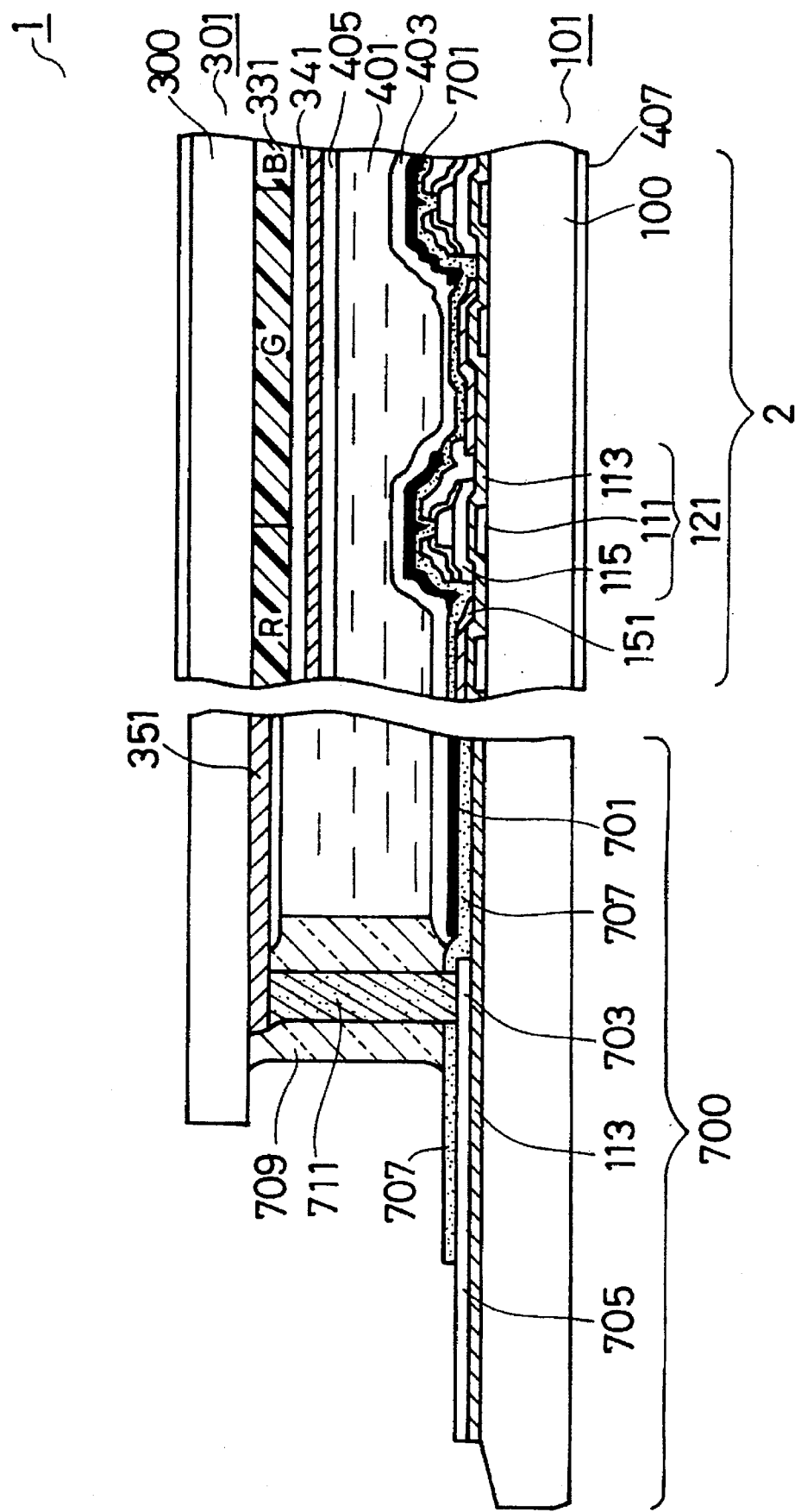
FIG. 11 is a longitudinal section view showing the main part of a liquid crystal display device according to a fourth embodiment on exaggerated scale.
Figure 12:
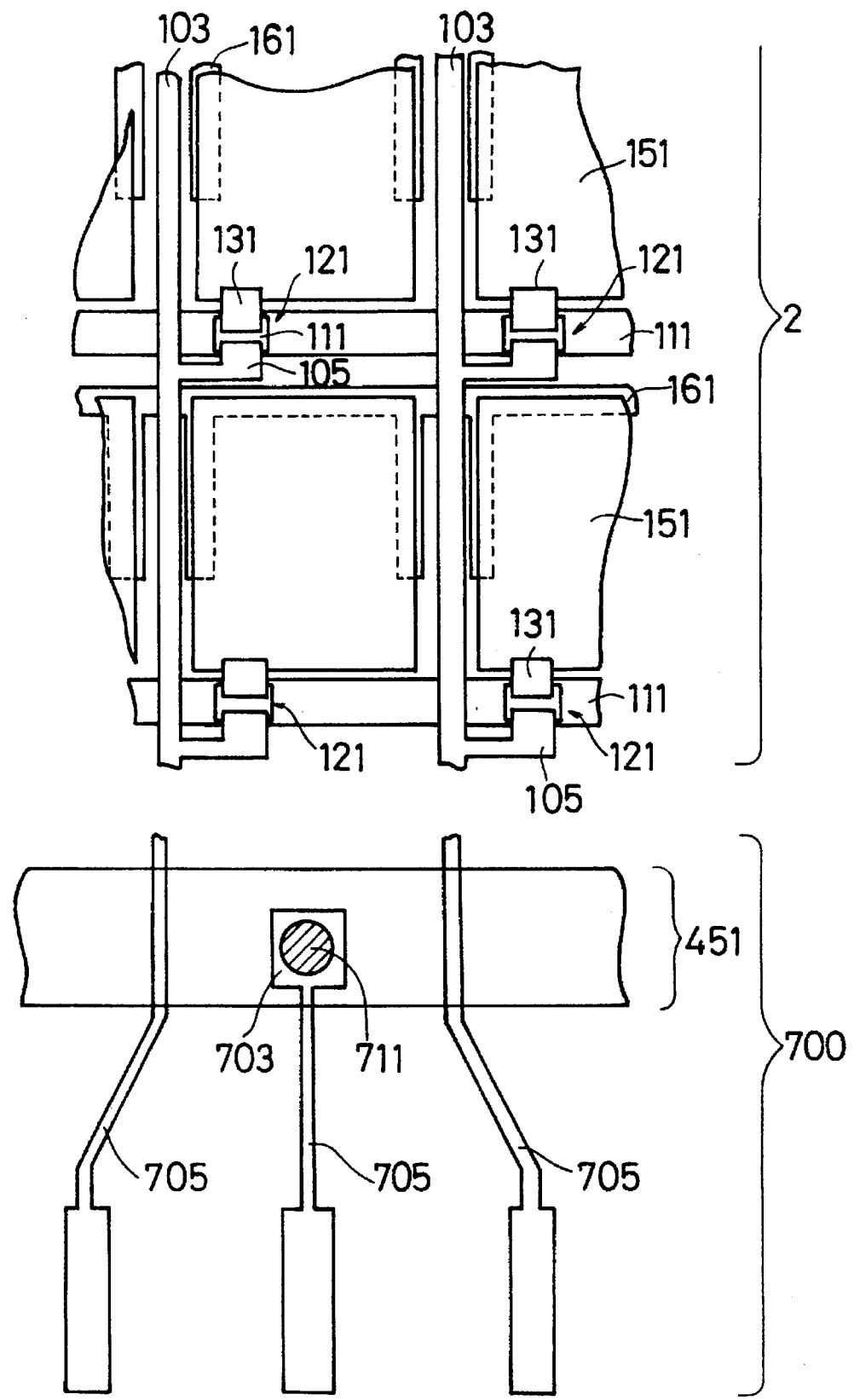
FIG. 12 is a plan view of the array substrate according to the fourth embodiment.

The liquid crystal display device 1 according to a fourth embodiment of the present invention is now described, reference being made to FIGS. 11 and 12.

This embodiment is a liquid crystal display device 1 which is characterized in that a light intercepting film 701 is disposed on an array substrate 101 [BM-ON-ARRAY system] with the counter potential supply terminals projecting from sides of a counter electrode 351.

First, the construction of a display area 2 of the array substrate 101 is described.

The light intercepting film 701 is made of metal, 3.g., chromium (Cr). It is disposed on a protective film (SiNx: silicon nitride) 707. It covers the gap between the signal line 103 and the picture element electrode 151, the gap between the scanning line 111 and the picture element electrode 151, and the TFT 121. An orientation film 403 is superimposed on this light intercepting film 701.

The light intercepting film 701 need not be made of metal but may be made of an organic material having light barrier properties (e.g. carbon particles dispersed in matrix resin), graphite, or the like.

When the array substrate 101 is constituted in the above manner, the counter substrate 301 need not be provided with a light intercepting film so that a greater margin of positioning the counter substrate 301 onto the array substrate 101 can be realized without affecting the aperture ratio. Thus, the aperture rate is determined on the side of the array substrate 101.

In the marginal region 700 of the array substrate 101, an orientation film 403 is provided on top of the light intercepting film 701. Moreover, in the marginal area of said orientation film 403, a protective film 707 is formed, covering the opening where the counter electrode connecting pad 703 is exposed. The connecting pad is extended from the counter electrode connecting wiring 705.

The counter substrate 301 is now described.

The counter substrate 301 comprises a transparent glass substrate 300 and color regions 331 of the three primary colors of red, green and blue. The color regions 331 can be formed by printing, photolithography, or dyeing. Moreover, if electrodes are formed in the positions corresponding to the respective color regions 331, these regions can be provided by the electrodeposition technique.

On the surface of the color regions 331, a counter electrode 351 is formed through an organic protective film 341. In this embodiment, unlike in the first through the third embodiments, the counter potential supply pad 353 for feeding an electric potential to the counter electrode 351 is formed in a picture frame fashion, instead of projections from the counter electrode 351, so that the counter electrode 351 may be supplied with the potential from any position along the four sides thereof. Then, an orientation film 405 is formed on the counter electrode 351.

A method of manufacturing the above liquid crystal display device 1 is now described.

(1) In the marginal area 700 of the array substrate 101, the boundary between said orientation film 403 and said protective film 707 is a sealant region 451. Therefore, a sealant 709 is applied to the sealant region 451 by screen printing. This screen printing is carried out so that the sealant 709 will not be applied to the area of the sealant region 451 which corresponds to the counter electrode connecting pad 703 of the array substrate 101 to provide a cylindrical pad 703. The width of the sealant region 451 is set at about 2 mm.

(2) Transfers 711 comprising a silver paste are dripped into the cylindrical opening in the sealant region 451.

(3) The counter substrate 301 is disposed as opposed to substrate 101 through a sealant 709. In this manner, the counter electrode connecting pad 703 is electrically connected to the counter potential supply terminals 351 through the transfer 711.

Since, in the above construction, the counter electrode 351 which is a common electrode is extended to the position overlapping the sealant 709 so that its portion is brought into contact with the counter electrode connecting pad 703 through the transfer 711, the glass substrate 300 on the counter substrate 301 side is not exposed to the liquid crystal composition 401 despite the absence of a light intercepting film on the counter substrate 301. Therefore, there is no contamination of the liquid crystal composition 401 with impurities derived from the glass so that a satisfactory display quality can be insured over a long time of use.

Though the color regions 331 are disposed on the counter substrate 301 in this embodiment, they may be disposed on the array substrate 101. In that case, the color regions 331 may be formed by printing or dyeing. By clever utilization of the picture element electrode 151, the color regions 331 may be constituted by the electrodeposition technique. Furthermore, a color dispersion may be applied to the entire surface and, then, imagewise exposed to light to form the color regions 331. In this manner, it is not necessary to provide a color filter on the counter substrate and the margin of the alignment can be increased without affecting the aperture ratio.

What is claimed is:

1. An active matrix display device comprising:

an array substrate having a plurality of picture element electrodes, a counter substrate having a counter electrode opposed to said array substrate, and a light modulating layer held between said array substrate and counter substrate, said counter substrate being provided with a plurality of first and second counter potential supply terminals, each first counter potential supply terminal being disposed on a first side of said counter electrode, each second counter potential supply terminal being disposed on a second side of said counter electrode which is opposite to said first side, said plurality of first counter potential supply terminals being axially and asymmetrically related to said plurality of second counter potential supply terminals, respectively.

2. The active matrix display device according to claim 1 wherein said plurality of first counter potential supply terminals project from said first side of said counter electrode and said plurality of second counter potential supply terminals project from said second side of said counter electrode.

3. The active matrix display device according to claim 2 wherein said plurality of first counter potential supply terminals and said plurality of second counter potential supply terminals project from a sealant region accommodating said light modulation layer.

4. The active matrix display device according to claim 1 wherein said plurality of first counter potential supply terminals and said plurality of second counter potential supply terminals are located within a sealant region accommodating said light modulating layer.

5. The active matrix display device according to claim 1 wherein said plurality of first counter potential supply terminals and said plurality of second counter potential supply terminals are located on longitudinal sides of a picture area of said display device.

6. The active matrix display device according to claim 1 wherein said plurality of first counter potential supply terminals and said plurality of second counter potential supply terminals are located on transverse or short sides of a picture area of said display device.

7. The active matrix display device according to claim 1 wherein said plurality of first counter potential supply terminals and said plurality of second counter potential supply terminals are located on four sides of a picture area of said display device.

8. The active matrix display device according to claim 1 wherein a light attenuating film in a matrix fashion is formed on said array substrate.

9. The active matrix display device according to claim 1 wherein color filters are formed on said array substrate.

10. A method of manufacturing an active matrix display device comprising the steps of:

forming first and second counter electrodes using a mask, said first and second counter electrodes respectively corresponding to first and second openings in said mask, said first and second openings in said mask being separated by a borderline portion to provide a counter substrate assemblage, and taking out said first and second counter electrodes from said counter substrate assemblage, one side of said borderline portion of said mask being provided with a plurality of first cuts extending from said first opening providing said first counter electrode with first counter potential supply terminals corresponding to said plurality of first cuts, a second side of said borderline portion of the mask being provided with a plurality of second cuts extending from said second opening providing said second counter electrode with second counter potential supply terminals corresponding to said plurality of second cuts, wherein said first cuts and said second cuts are formed in an alternating fashion on said borderline portion.

11. The method of manufacturing an active matrix display device according to claim 10 wherein said first and second cuts extending from said first opening are formed on longitudinal sides of said first opening, and wherein said first and second cuts extending from said second opening are formed on longitudinal sides of said second opening.

12. The method of manufacturing an active matrix display device according to claim 10 wherein said first and second cuts extending from said first opening are formed on transverse or short sides of said first opening, and wherein said first and second cuts extending from said second opening are formed on transverse or short sides of said second opening.

13. The method of manufacturing an active matrix display device according to claim 10 wherein some of said first and second cuts are extended from four sides of said first opening and other of said first and second cuts are extended from four sides of said second opening.

* * * * *